(12) United States Patent
Lin

(10) Patent No.: US 6,192,830 B1
(45) Date of Patent: Feb. 27, 2001

(54) UNDERWATER FISH FOOD FEEDER

(76) Inventor: Ying-Feng Lin, No. 25, Lane 50, Sec. 3, Chung-Hsiao Rd., Sanchung City, Taipei County (TW)

( * ) Notice: Subject to any disclaimer, the term of this patent is extended or adjusted under 35 U.S.C. 154(b) by 0 days.

(21) Appl. No.: 09/356,909

(22) Filed: Jul. 20, 1999

(51) Int. Cl.[7] .................................................. A01K 61/02
(52) U.S. Cl. ........................................................ 119/51.04
(58) Field of Search .............................. 119/51.04, 230, 119/232, 51.01, 665; 222/4

(56) References Cited

U.S. PATENT DOCUMENTS

| | | | |
|---|---|---|---|
| 3,874,340 | * | 4/1975 | Lemond et al. ................... 119/51.04 |
| 4,089,299 | * | 5/1978 | Suchowski ........................ 119/51.04 |
| 4,156,401 | * | 5/1979 | Ogui ..................................... 119/259 |
| 4,492,182 | * | 1/1985 | Wensman et al. ................. 119/51.04 |
| 5,791,285 | * | 8/1998 | Johnson ............................. 119/51.04 |
| 5,797,348 | * | 8/1998 | Taherzadeh .......................... 119/230 |
| 5,957,085 | * | 9/1999 | Youngstrom et al. ............... 119/246 |
| 6,016,767 | * | 1/2000 | Kyrkjebø .......................... 119/51.04 |

FOREIGN PATENT DOCUMENTS

| | | | | |
|---|---|---|---|---|
| 2421626 | * | 11/1975 | (DE) | ................................... 119/51.04 |
| 2932762 | * | 2/1981 | (DE) | ................................... 119/51.04 |
| 1351877 | * | 5/1974 | (GB) | ................................... 119/51.04 |
| 2000421 | * | 1/1979 | (GB) | ................................... 119/51.04 |
| 405168366 | * | 7/1993 | (JP) | ................................... 119/51.04 |

* cited by examiner

Primary Examiner—Michael J. Carone
Assistant Examiner—Son T. Nguyen
(74) Attorney, Agent, or Firm—Rosenberg, Klein & Lee

(57) ABSTRACT

An underwater fish food feeder, which includes a barrel, a screw cap and a nozzle holder fastened to two distal ends of the barrel, the screw cap having a filling hole through which fish food is filled into the barrel and a connector connected to a high pressure air source, the nozzle holder holding a high pressure air control valve on the inside and a nozzle on the outside, a guide tube connected between the connector at the screw cap and an air inlet at the high pressure air control valve, a nozzle tube connected to an air outlet at the control valve and suspended in the barrel, and a control button mounted in the high pressure air control valve and operated to open the air passage between the air inlet and the air outlet in the high pressure air control valve for enabling high pressure air to pass through the air nozzle tube into the barrel, to further force fish food out of the nozzle holder and the nozzle for feeding water animals.

3 Claims, 4 Drawing Sheets

UNDERWATER FISH FOOD FEEDER

BACKGROUND OF THE INVENTION

The present invention relates to an underwater fish food feeder for use to feed water animals with fish food when diving, and more particularly to such an underwater fish food feeder which uses the air pressure of the air tank (oxygen cylinder) as driving source means to drive fish food out of a barrel into the water for feeding water animals when diving.

Skin diving is a kind of water sport that attracts people of different ages. Developing skin diving can also attract tourists. When diving, one can see a variety of water plants and water animals under the water. In order to attract water animals, one may carry fish food when diving. However, it is not easy to carry and feed fish food under the water. Further, it is difficult to control the feeding amount of fish food when feeding fish food by hand.

SUMMARY OF THE INVENTION

The present invention has been accomplished under the circumstances in view. It is the main object of the present invention to provide an underwater fish food feeder, which can be used with the air tank (oxygen cylinder) during diving, enabling fish food to be automatically distributed into the water by means of controlling a control button.

DETAILED DESCRIPTION OF THE PREFERRED EMBODIMENT

Figure 1:
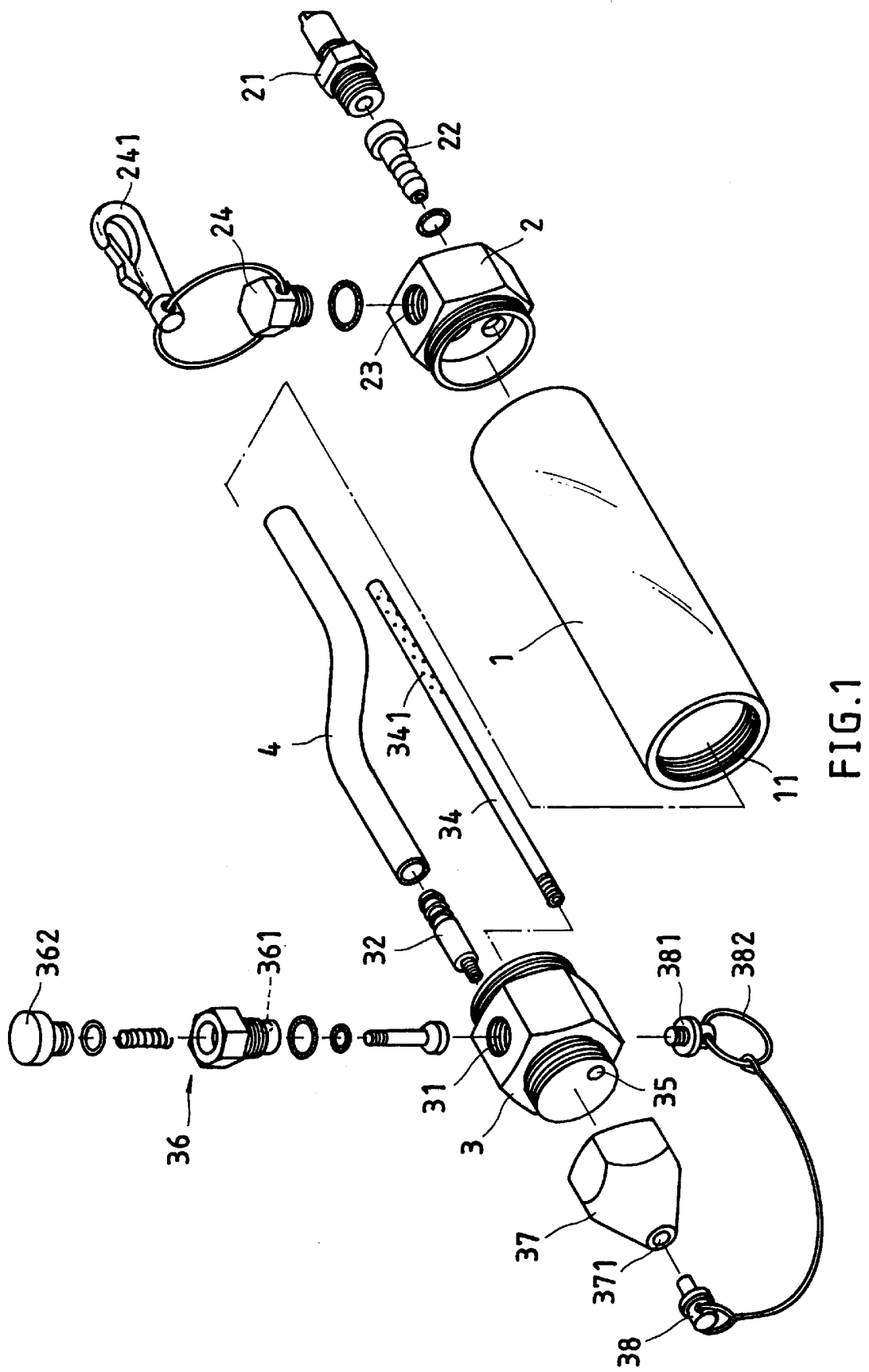
FIG. 1 is an exploded view of an underwater fish food feeder according to the present invention.
Figure 2:
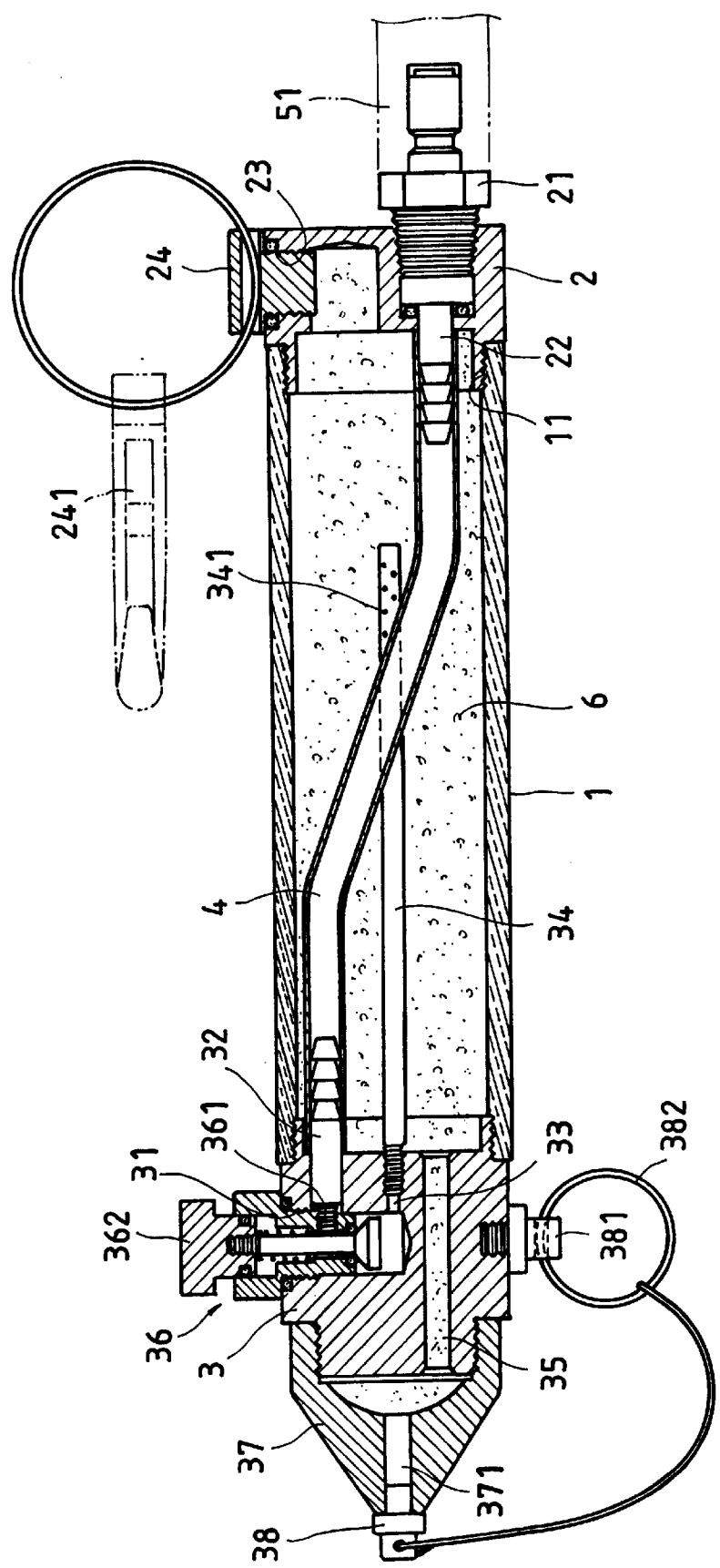
FIG. 2 is a longitudinal view in section of the underwater fish food feeder according to the present invention.
Figure 3:
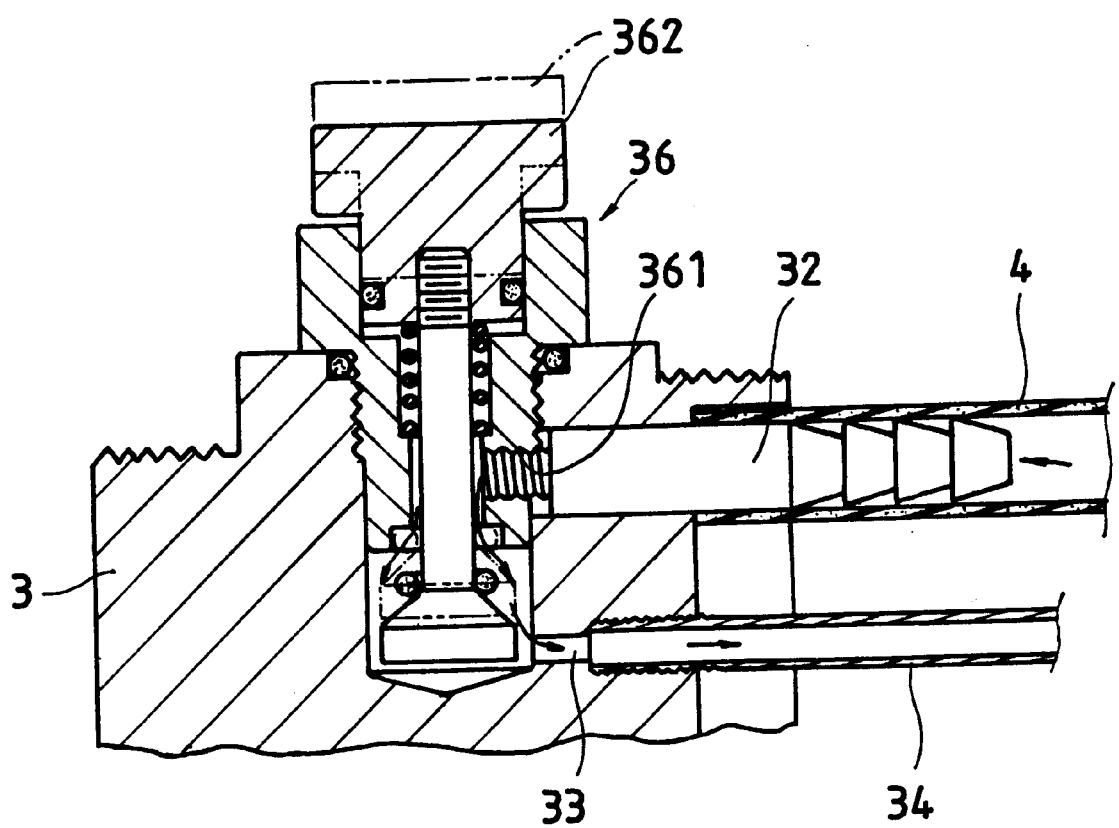
FIG. 3 is a sectional view in an enlarged scale of a part of the present invention, showing the positioning of the high pressure air control valve, the guide tube and the air nozzle tube at the nozzle holder.
Figure 4:
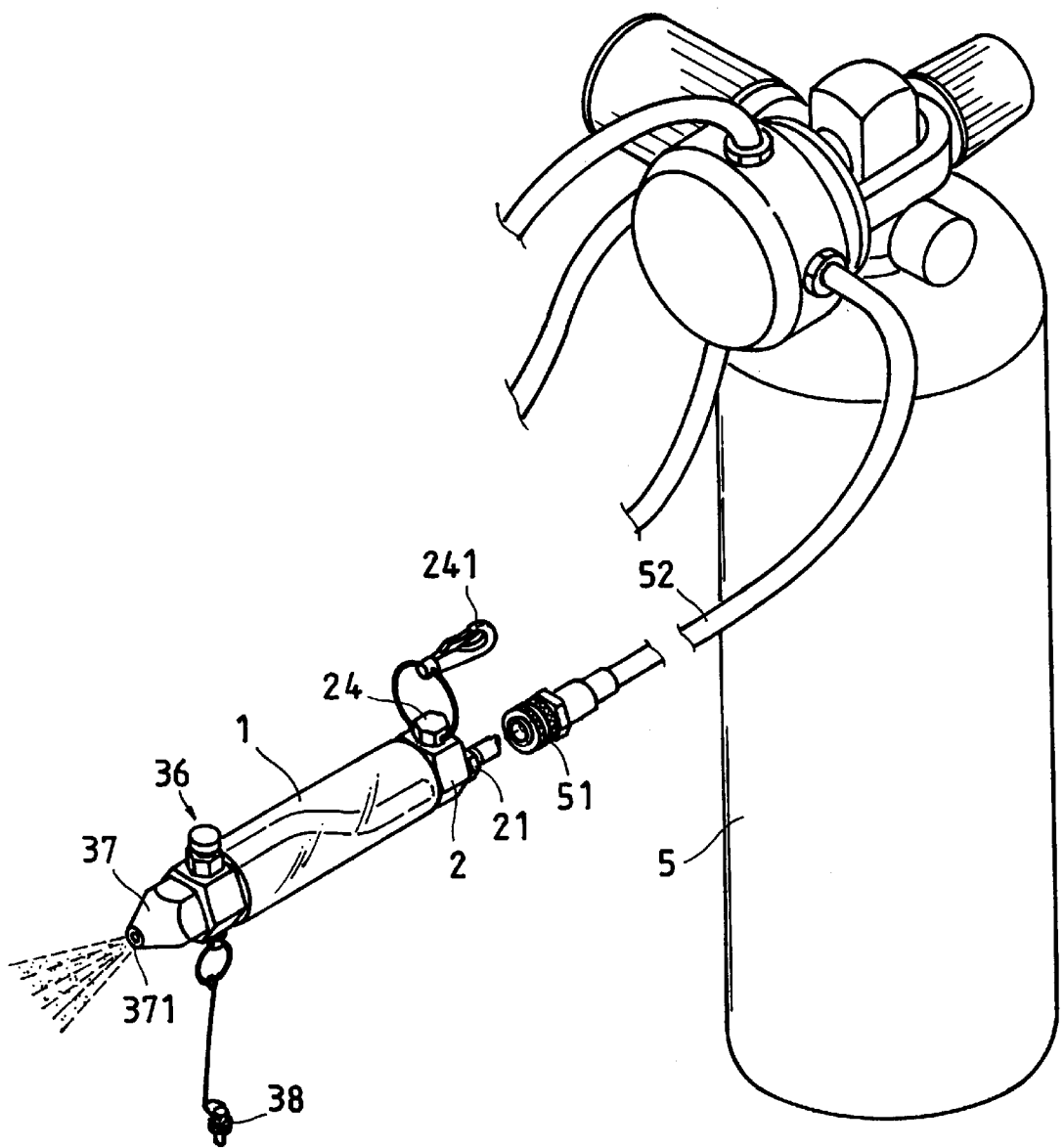
FIG. 4 is an applied view of the present invention.

Referring to FIGS. from 1 through 4, an underwater fish food feeder is shown comprised of a barrel 1 for holding fish food 6, a nozzle holder 3 fastened to one end, namely, the front end of the barrel 1, and a screw cap 2 fastened to the opposite end, namely, the rear end of the barrel 1. The barrel 1 has two inner threads 11 respectively provided at its front and rear ends. The screw cap 2 is threaded into the inner thread 11 at the rear end of the barrel 1, having a connector 21 installed therein for detachably quick connection of the quick connector 51 at one end of an oxygen output hose 52 from an oxygen cylinder 5, and a threaded filling hole 23. A tip member 22 is connected to one end of the connector 21 inside the screw cap 2 for the connection of a guide tube 4. A screw bolt 24 is threaded into the threaded filling hole 23 at the screw cap 2 to hold a swivel hook 241. By means of the swivel hook 241, the underwater fish food feeder can be conveniently fastened to., for example, the user's waist belt. After removal of the screw bolt 24, fish food 6 can be filled into the barrel 1 through the threaded filling hole 23 at the screw cap 2. The nozzle holder 3 comprises a side hole 31, and an axial through hole 35. A nozzle 37 is connected to the nozzle holder 3 and disposed outside the barrel 1, having a nozzle hole 371 disposed in communication with the axial through hole 35 at the nozzle holder 3. A high pressure air control valve 36 is mounted in the side hole 31 at the nozzle holder 3, having an air inlet 361 connected to one end of the guide tube 4 by a connector 32 inside the nozzle holder 3, and an air outlet 33. An air nozzle tube 34 is connected to the air outlet 33 at the high pressure air control valve 36 and suspended in the barrel 1, having a plurality of jet nozzles 341. The guide tube 4 is connected between the connector 32 and the tip member 22. A control button 362 is fastened to the high pressure air control valve 36, and operated to close/open the air inlet 361. When the control button 362 is depressed to open the air inlet 361, high pressure gas is guided through the guide tube 4 into high pressure air control valve 36, and then guided out of the high pressure air control valve 36 through the air outlet 33 into the inside of the barrel 1 via the air nozzle tube 34, thereby causing fish food 6 to be driven into the axial through hole 35 and then forced out of the nozzle 37 through the nozzle hole 371 to feed water animals. A swivel ring 381 is fastened to the nozzle holder 3 on the outside. A plug 38 is fastened to the ring 382 of the swivel ring 381 by for example a cord member. The plug 38 can be plugged into the nozzle hole 371 to close the nozzle 37.

While only one embodiment of the present invention has been shown and described, it will be understood that various modifications and changes could be made thereunto without departing from the spirit and scope of the invention disclosed.

What the invention claimed is:

1. An underwater fish food feeder comprising:

a barrel for holding fish food, said barrel comprising a front end and a rear end;

a screw cap fastened to the rear end of said barrel, said screw cap having a connector installed therein for connection to a high pressure air source to receive high pressure air, and a filling hole through which fish food is filled into said barrel;

a nozzle holder fastened to the front end of said barrel, said nozzle holder comprising a side hole, and an axial through hole;

a nozzle connected to said nozzle holder and disposed outside said barrel, said nozzle having a nozzle hole disposed in communication with the axial through hole at said nozzle holder;

a high pressure air control valve mounted in the side hole at said nozzle holder, said high pressure air control valve comprising an air inlet, and an air outlet disposed in communication with said air inlet;

a control button mounted in said high pressure air control valve and operated to open/close the air passage between said air inlet and said air outlet in said high pressure air control valve;

an air nozzle tube connected to the air outlet at said high pressure air control valve and suspended in said barrel, said air nozzle tube having a plurality of jet nozzles; and a guide tube connected between the air inlet at said high pressure air control valve and the connector in said screw cap to guide high pressure air into said high pressure air control valve, for enabling high pressure air to be driven out of the jet nozzles at said air nozzle tube into said barrel, after opening of the air passage between said air inlet and said air outlet in said high pressure air control valve, to force fish food out of said nozzle holder and said nozzle through the axial through hole at said nozzle holder and the nozzle hole at said nozzle for feeding water animals.

2. The underwater fish food feeder of claim 1 further comprising a screw bolt fastened to the filling hole at said screw cap by a screw joint, said screw bolt holding a swivel hook for fastening.

3. The underwater fish food feeder of claim 1 further comprising a swivel ring fastened to said nozzle holder outside said barrel, and plug fastened to said swivel ring by a cord member for plugging into said nozzle hole to close said nozzle.

* * * * *